United States Patent
Choi

(10) Patent No.: US 10,088,860 B2
(45) Date of Patent: Oct. 2, 2018

(54) REACTIVE POWER COMPENSATION SYSTEM AND METHOD THEREOF

(71) Applicant: LSIS CO., LTD., Gyeonggi-do (KR)

(72) Inventor: Yong-Kil Choi, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/585,217

(22) Filed: May 3, 2017

(65) Prior Publication Data

US 2017/0344046 A1   Nov. 30, 2017

(30) Foreign Application Priority Data

May 31, 2016 (KR) .................. 10-2016-0067076

(51) Int. Cl.
| | |
|---|---|
| *G05F 1/70* | (2006.01) |
| *H02J 3/01* | (2006.01) |
| *H02J 3/16* | (2006.01) |
| *H02J 3/18* | (2006.01) |
| *H02J 3/26* | (2006.01) |
| *H02J 3/00* | (2006.01) |

(52) U.S. Cl.
CPC ................ *G05F 1/70* (2013.01); *H02J 3/01* (2013.01); *H02J 3/16* (2013.01); *H02J 3/18* (2013.01); *H02J 3/26* (2013.01); *H02J 2003/002* (2013.01); *Y02E 40/34* (2013.01); *Y02E 40/40* (2013.01); *Y02E 40/50* (2013.01)

(58) Field of Classification Search
CPC . F27B 3/28; H05B 7/144; F27D 11/10; F27D 2019/0037; Y02P 10/216; H02J 3/1864

USPC .......... 373/102–108; 323/205, 20, 207–209, 323/284; 307/102, 105, 64

See application file for complete search history.

(56) References Cited

U.S. PATENT DOCUMENTS

| | | | |
|---|---|---|---|
| 3,936,727 A | 2/1976 | Kelley et al. | |
| 4,104,576 A * | 8/1978 | Frank | H02J 3/1864 323/210 |
| 6,603,795 B2 * | 8/2003 | Ma | H05B 7/148 373/102 |
| 7,295,593 B2 * | 11/2007 | Sedighy | F27B 3/28 373/102 |

(Continued)

FOREIGN PATENT DOCUMENTS

| | | |
|---|---|---|
| CN | 1112750 C | 6/2003 |
| CN | 105098795 A | 11/2015 |

(Continued)

OTHER PUBLICATIONS

Japanese Office Action for related Japanese Application No. 2017-046367; action dated Jun. 5, 2018; (4 pages).

(Continued)

*Primary Examiner* — Rajnikant Patel
(74) *Attorney, Agent, or Firm* — K&L Gates LLP

(57) ABSTRACT

The present disclosure relates to a reactive power compensation system including a reactive power compensation unit for measuring compensate reactive power, an impedance measurement unit for measuring an impedance value of each of a plurality of loads, and a learning control unit for controlling the reactive power compensation unit based on the measured impedance value.

10 Claims, 3 Drawing Sheets

(56) References Cited

U.S. PATENT DOCUMENTS

| | | | |
|---|---|---|---|
| 8,180,310 B2* | 5/2012 | Vazny | H04B 1/18 |
| | | | 455/24 |
| 2008/0106241 A1* | 5/2008 | Deaver | H02J 3/1828 |
| | | | 323/209 |
| 2010/0007314 A1* | 1/2010 | Ivie | G05F 1/70 |
| | | | 323/210 |
| 2011/0148303 A1* | 6/2011 | Van Zyl | H03F 1/56 |
| | | | 315/111.21 |
| 2013/0134779 A1 | 5/2013 | Watanabe | |

FOREIGN PATENT DOCUMENTS

| | | |
|---|---|---|
| GB | 2521414 A | 6/2015 |
| JP | H11289661 A | 10/1999 |
| JP | H11289663 A | 10/1999 |
| JP | H11289664 A | 10/1999 |
| JP | 2007267440 A | 10/2007 |
| JP | 2011-35951 A | 2/2011 |
| JP | 5862955 B2 | 2/2016 |
| JP | 2016-100967 A | 5/2016 |
| KR | 10-1642719 B1 | 7/2016 |
| WO | 96/00936 A1 | 1/1996 |

OTHER PUBLICATIONS

European Search Report for related European Application No. 17159536.6; report dated Oct. 11, 2017; (7 pages).

* cited by examiner

REACTIVE POWER COMPENSATION SYSTEM AND METHOD THEREOF

CROSS-REFERENCE TO RELATED APPLICATIONS

This application claims the priority of Korean Patent Application No. 10-2016-0067076 filed on May 31, 2016, in the Korean Intellectual Property Office, the disclosure of which is hereby incorporated by reference in its entirety.

BACKGROUND

1. Technical Field

The present disclosure relates to a reactive power compensation system and a method thereof.

2. Description of the Related Art

When power is supplied to a receiving end connected to a load, the power is not all used by the load. In other words, the power is not all used as active power by the load and part of the power is lost as reactive power not contributing to a real work.

To minimize or compensate the reactive power, a reactive power compensation system is employed.

The reactive power compensation system adjusts a phase of a voltage or a phase of current and thus the reactive power may be minimized.

However, in a conventional reactive power compensation system, since the reactive power is simply compensated without considering a loading state of each of the loads 21a, 21b, 21c, 23a, 23b, and 23c or an environmental change, accurate and efficient compensation of reactive power is impossible.

SUMMARY

It is an object of the present disclosure to address the above-described problems and other problems.

It is another object of the present disclosure to provide a reactive power compensation system for compensating reactive power considering a loading state of each of the loads 21a, 21b, 21c, 23a, 23b, and 23c or an environmental change, and a method thereof.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, a system for compensating reactive power includes a reactive power compensation unit for measuring compensate reactive power, an impedance measurement unit for measuring an impedance value of each of a plurality of loads, and a learning control unit for controlling the reactive power compensation unit based on the measured impedance value.

In accordance with one aspect of the present disclosure, a method of compensating reactive power includes measuring an impedance value of each of a plurality of loads, monitoring an impedance change amount according to according to a loading state of each of the loads or an environmental change, determining an optimal control mode based on a monitored impedance change amount, and generating a control signal to compensate reactive power according to a determined optimal control mode.

DETAILED DESCRIPTION

Figure 1:
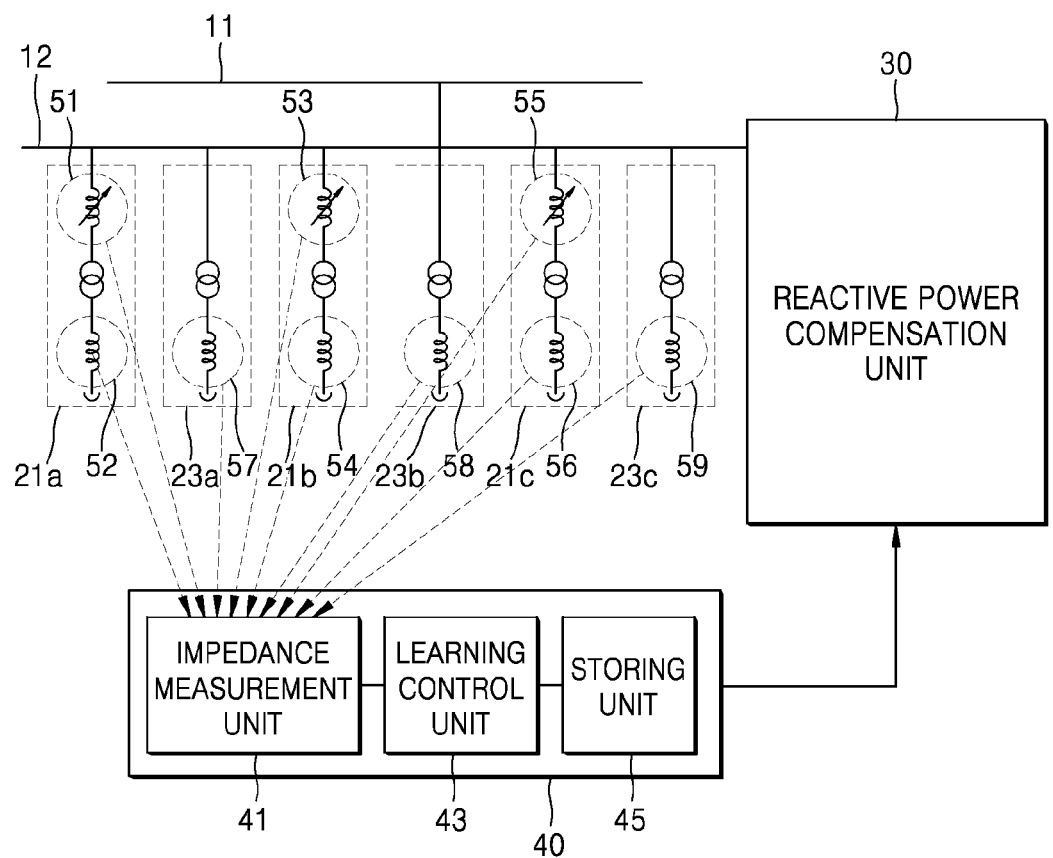
FIG. 1 illustrates a reactive power compensation system according to an embodiment of the present disclosure.

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well-known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

As the inventive concept allows for various changes and numerous embodiments, particular embodiments will be illustrated in the drawings and described in detail in the written description, wherein like reference numerals in the drawings denote like elements, and thus their description will not be repeated. The suffix "module" and "unit" for components, which are used in the description below, are assigned and mixed in consideration of only the easiness in writing the specification. That is, the suffix itself does not have different meanings or roles. However, this is not intended to limit the present inventive concept to particular modes of practice, and it is to be appreciated that all changes, equivalents, and substitutes that do not depart from the spirit and technical scope of the present inventive concept are encompassed in the present inventive concept. In the description of the present inventive concept, certain detailed explanations of related art are omitted when it is deemed that they may unnecessarily obscure the essence of the inventive concept.

Figure 2:
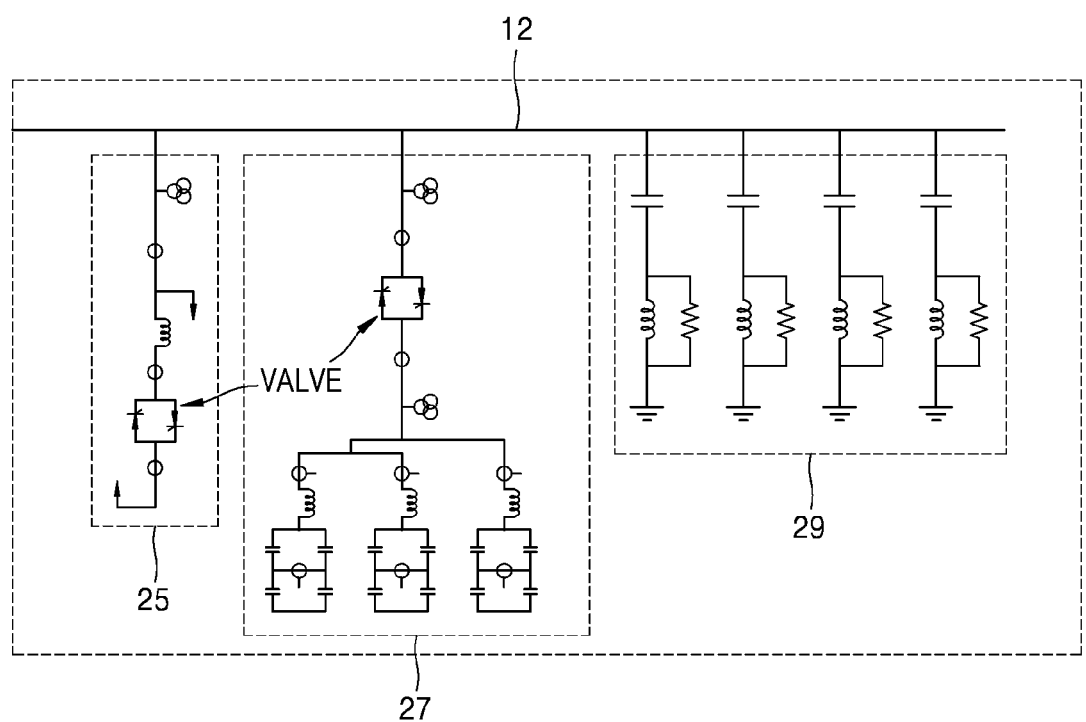
FIG. 2 illustrates a reactive power compensation unit of FIG. 1.

FIG. 1 illustrates a reactive power compensation system according to an embodiment of the present disclosure. FIG. 2 illustrates a reactive power compensation unit 30 of FIG. 1.

Referring to FIGS. 1 and 2, the reactive power compensation system according to the present embodiment may include the reactive power compensation unit 30 and a control system 40.

A plurality of loads 21a, 21b, 21c, 23a, 23b, and 23c may be connected to a receiving end 11. In detail, a branch line 12 may be branched from the receiving end 11, and the loads 21a, 21b, 21c, 23a, 23b, and 23c may be connected to the branch line 12.

Although FIG. 1 illustrates that the branch line 12 is connected to the receiving end 11, the loads 21a, 21b, 21c, 23a, 23b, and 23c may be directly connected to the receiving end 11 without the branch line 12.

The loads 21a, 21b, 21c, 23a, 23b, and 23c may be connected to a system (not shown) other than the receiving end 11. The system may be, for example, an AC system, a DC system, or a HVDC system, but the present disclosure is not limited thereto.

The loads 21a, 21b, 21c, 23a, 23b, and 23c may be loads provided in an ironworks, for example, arc furnaces 21a, 21b, and 21c or smelting furnaces 23a, 23b, and 23c, but the present disclosure is not limited thereto.

The reactive power compensation unit 30 may be connected parallel to the loads 21a, 21b, 21c, 23a, 23b, and 23c and commonly with the loads 21a, 21b, 21c, 23a, 23b, and 23c to the branch line 12 or the receiving end 11, but the present disclosure is not limited thereto. Accordingly, power supplied to the receiving end 11 may be supplied not only to the loads 21a, 21b, 21c, 23a, 23b, and 23c, but also to the reactive power compensation unit 30.

The reactive power compensation unit 30, as illustrated in FIG. 2, may include a Thyristor-controlled reactor (TCR) 25, a Thyristor-switched capacitor (TSC) 27, and a harmonic filter unit 29.

The TCR 25 may include a reactor and a thyristor switch, that is, a valve. The number or arrangement of reactors may be implemented by various methods.

The TSC 27 may include a capacitor and a thyristor switch, that is, a valve. The number or arrangement of capacitors may be implemented by various methods.

The harmonic filter unit 29 may include a plurality of filters. Each filter may include a resistor, a capacitor, and an inductor. Although the resistor and the inductor may be connected in parallel, but the present disclosure is not limited thereto.

Both the TCR 25 and the TSC 27 are not necessarily provided. Only one of the TCR 25 and the TSC 27 may be provided, but the present disclosure is not limited thereto.

Although not illustrated, a fixed compensation unit may be further provided in addition to the TCR 25 or the TSC 27. The fixed compensation unit may be a fixed capacitor.

The reactive power compensation unit 30 may control a Thyristor switch provided inside to compensate reactive power.

According to the present disclosure, reactive power may be compensated by measuring impedance of each of the loads 21a, 21b, 21c, 23a, 23b, and 23c and reflecting an amount of a change in the impedance of each of the loads 21a, 21b, 21c, 23a, 23b, and 23c.

The impedance of each of the loads 21a, 21b, 21c, 23a, 23b, and 23c may vary according to a loading state of each of the loads 21a, 21b, 21c, 23a, 23b, and 23c or an environmental change.

For example, impedance of each of the loads 21a, 21b, 21c, 23a, 23b, and 23c when two of six loads of the loads 21a, 21b, 21c, 23a, 23b, and 23c illustrated in FIG. 1 are operated may be different from impedance of each of the loads 21a, 21b, 21c, 23a, 23b, and 23c when five of the loads 21a, 21b, 21c, 23a, 23b, and 23c are operated.

In addition, the environmental change may include the type, amount, temperature, etc. of a work to be processed by each of the loads 21a, 21b, 21c, 23a, 23b, and 23c, and the impedance of each of the loads 21a, 21b, 21c, 23a, 23b, and 23c may vary according to the type, amount, temperature, etc. of the work.

Accordingly, reactive power may be compensated by reflecting an amount of a change in the impedance that varies according to the loading state of each of the loads 21a, 21b, 21c, 23a, 23b, and 23c or the environmental change. Accordingly, since relatively accurate compensation of reactive power is performed, efficient use of power may be possible and further reliability of reactive power compensation system may be improved.

The loads 21a, 21b, 21c, 23a, 23b, and 23c may be respectively provided with impedance detection units 51 to 59. The impedance detection units 51 to 59 respectively provided in the loads 21a, 21b, 21c, 23a, 23b, and 23c may detect impedance values that are analog signals. The analog impedance values detected by the loads 21a, 21b, 21c, 23a, 23b, and 23c may be provided to the control system 40.

The control system 40 may include an impedance measurement unit 41, a learning control unit 43, and a storing unit 45.

The impedance measurement unit 41 may receive an input of an analog impedance value detected by each of the loads 21a, 21b, 21c, 23a, 23b, and 23c, convert a received analog impedance value to a digital signal and amplify and/or modulate the digital signal, thereby measuring an impedance value. The measured impedance value with respect to each of the loads 21a, 21b, 21c, 23a, 23b, and 23c may be provided to the learning control unit 43.

Although not illustrated, each of the loads 21a, 21b, 21c, 23a, 23b, and 23c may be provided with a device, for example, a switch, capable of checking a loading state of each of the loads 21a, 21b, 21c, 23a, 23b, and 23c. When a load is operated, a switch corresponding to the load is turned on, and when the load is not operated, the switch may be turned off. Accordingly, whether a load is operated or not may be checked according to a turn-on state or a turn-off state of a switch corresponding to the load of the switches provided in the loads 21a, 21b, 21c, 23a, 23b, and 23c. As such, loading state information of each of the loads 21a, 21b, 21c, 23a, 23b, and 23c may be provided to the learning control unit 43.

Furthermore, the type or amount of a work to be processed by each of the loads 21a, 21b, 21c, 23a, 23b, and 23c is preset, and the learning control unit 43 may recognize the type or amount of a work in real time.

In addition, a work temperature sensed by a temperature sensor (not shown) provided in a place where the loads 21a, 21b, 21c, 23a, 23b, and 23c are placed may be provided to the learning control unit 43.

The learning control unit 43 may execute a learning control algorithm based on an amount of a change in the load impedance according to a loading state of each of the loads 21a, 21b, 21c, 23a, 23b, and 23c or the environmental change, thereby controlling compensation of reactive power.

The learning control algorithm is a control system with a learning function. A control method itself is not designed in advance, but the control method is searched for by learning while observing a control object or a process situation and a found control method is executed.

Fuzzy, neural, chaos, artificial intelligence, etc. may be used as the learning control algorithm.

One of the following four control modes may be selected based on a result of the determination using the learning control algorithm, and reactive power may be compensated according to the selected control mode.

(1) Voltage control mode
(2) Reactive power control mode
(3) Flicker compensation mode
(4) Voltage unbalance mode The voltage control mode is a control mode to maintain power supplied to the receiving end 11 in a constant state. For example, as an amount of reactive power increases, a voltage of power supplied to the receiving end 11 drops. In this case, the voltage control mode is executed to increase a voltage of the power supplied to the receiving end 11 to be maintained at a voltage prior to the voltage drop.

The reactive power control mode is a control mode to calculate an amount of reactive power and compensate reactive power based on a calculated reactive power amount.

For example, as phases of a voltage and current approach 90°, the amount of reactive power increases. Accordingly, when the reactive power control mode is executed, the Thyristor switch provided in each of the TCR 25 and the TSC 27 may be switch controlled as the phases of a voltage and current approach 0°.

The flicker compensation mode is a control mode to prevent voltage flicker generated for various reasons. The reasons are as follows.

(1) Operation, stop and repeat of arc discharge equipment by a converter, a welder, an arc tester, etc.

(2) Lightning surge input due to lightning damage caused by direct lightning, induced lightning, etc., or induced surge (3) Frequent opening and closing of contactors such as electric motors by conveying machine (4) High current when fault occurs due to short circuit or ground fault, and its blockage (5) Opening and closing operation of a switch by the transformer inrush current (6) Extremely short opening and closing time by the inverter and sudden change in the voltage change amount When operated in the flicker compensation mode, a reactive power amount may be calculated based on a ΔV reference value, for example, Δ10, and reactive power may be compensated based on the calculated reactive power amount. In the case of Δ10, by generally recalculating voltage fluctuation for one hour into a size of 10 Hz, the size or frequency of occurrence of flicker may be calculated.

The voltage unbalance mode may be a mode to compensate voltage unbalance.

Since the load is a single-phase load with a large fluctuation in AC, voltage unbalance occurs on a three-phase power supply side and a large voltage fluctuation occurs between specific phases. Since the voltage unbalance causes overheat or power drop, the voltage unbalance may be reduced by converting a 3-phase to a 2-phase simultaneously when a power source with a large short-circuit capacity receives power.

Accordingly, in the voltage unbalance mode, a 3-phase is controlled to be converted to a 2-phase.

Referring back to FIG. 1, the learning control unit 43 may determine a control mode to be controlled based on an impedance change amount of each of the loads 21*a*, 21*b*, 21*c*, 23*a*, 23*b*, and 23*c*, and generate a control signal according to the determined control mode.

For example, when the control mode is determined to be the reactive power control mode or the flicker compensation mode, a control signal may be provided to the reactive power compensation unit 30, and reactive power may be compensated according to the control signal provided by the reactive power compensation unit 30. In this state, the reactive power compensation unit 30 may include the TCR 25, the TSC 27, or a fixed capacitor (not shown), and as the Thyristor switch provided in the TCR 25 or the TSC 27 is switch controlled, reactive power may be compensated.

For example, when the control mode is determined to be the voltage control mode, the control signal may be transmitted to a supply end for supplying power to the receiving end 11. The supply end may increase a voltage of power according to a control signal and then the power with an increased voltage may be supplied to the receiving end 11. As such, a voltage at a position of the receiving end 11 to which the loads 21*a*, 21*b*, 21*c*, 23*a*, 23*b*, and 23*c* are connected may be maintained constant by the power with an increased voltage.

For example, when the control mode is determined to be the flicker compensation mode, the control signal may be provided to the reactive power compensation unit 30 and thus reactive power may be compensated by the reactive power compensation unit 30 according to the control signal.

The storing unit 45 may store a program about the learning control algorithm.

The storing unit 45 may store various pieces of setting information, for example, the type or amount of a work to be processed by each of the loads 21*a*, 21*b*, 21*c*, 23*a*, 23*b*, and 23*c*.

The storing unit 45 may store a work temperature sensed in a place where the loads 21*a*, 21*b*, 21*c*, 23*a*, 23*b*, and 23*c* are placed.

The storing unit 45 may store control mode information determined by the learning control unit 43, state information of reactive power compensation system, state information of each of the loads 21*a*, 21*b*, 21*c*, 23*a*, 23*b*, and 23*c*, etc.

The storing unit 45 may store various pieces of information that are not described above, but are needed to implement the present disclosure.

Figure 3:
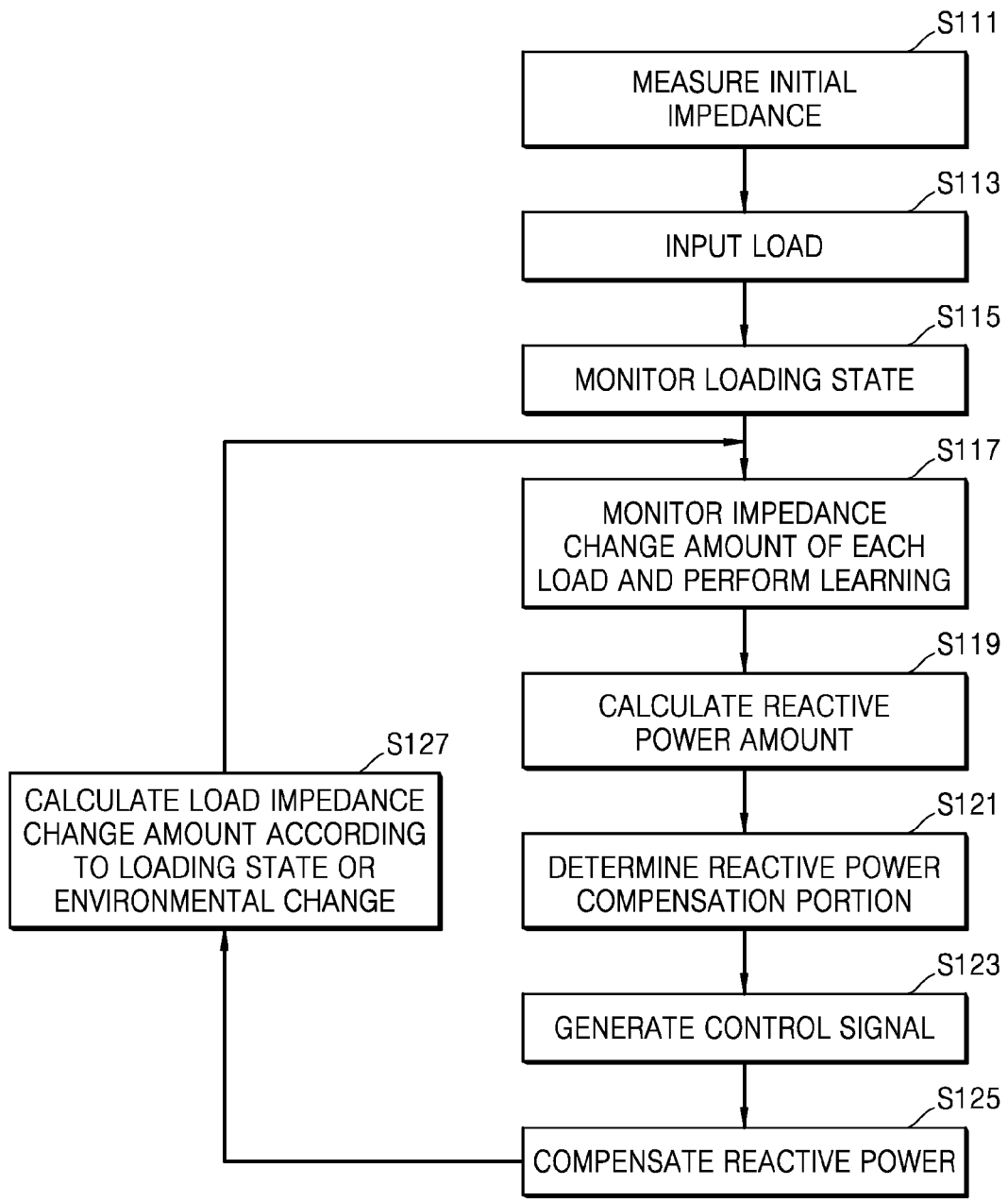
FIG. 3 is a flowchart for explaining a method of compensating reactive power according to an embodiment of the present disclosure.

FIG. 3 is a flowchart for explaining a method of compensating reactive power according to an embodiment of the present disclosure.

Referring to FIGS. 1 to 3, the impedance measurement unit 41 may measure initial load impedance (S111). Although the initial load impedance may be measured during an operation of the reactive power compensation system, but the present disclosure is not limited thereto.

In detail, analog impedance values may be detected by the impedance detection units 51 to 59 respectively provided in the loads 21*a*, 21*b*, 21*c*, 23*a*, 23*b*, and 23*c*, and provided to the impedance measurement unit 41. The impedance measurement unit 41 may measure the initial impedance value by converting the analog impedance value detected by each of the loads 21*a*, 21*b*, 21*c*, 23*a*, 23*b*, and 23*c* to a digital signal and then amplifying and modulating the signal.

Loading is performed considering the work amount of each of the loads 21*a*, 21*b*, 21*c*, 23*a*, 23*b*, and 23*c* (S113). The loading may signify that each of the loads 21*a*, 21*b*, 21*c*, 23*a*, 23*b*, and 23*c* is operated.

An initial impedance value may be measured before each of the loads 21*a*, 21*b*, 21*c*, 23*a*, 23*b*, and 23*c* is operated.

A loading state may be monitored (S115).

Whether each of the loads 21*a*, 21*b*, 21*c*, 23*a*, 23*b*, and 23*c* is operated may be monitored based on a turn-on or turn-off state of the switch provided in each of the loads 21*a*, 21*b*, 21*c*, 23*a*, 23*b*, and 23*c*.

The learning control unit 43 may monitor an impedance change amount and may perform learning control based on a result of the monitoring (S117).

The impedance of each of the loads 21*a*, 21*b*, 21*c*, 23*a*, 23*b*, and 23*c* may vary according to the number of loads in operation or the environmental change.

The environmental change may include the type, amount, temperature, etc. of a work to be processed by each of the loads 21*a*, 21*b*, 21*c*, 23*a*, 23*b*, and 23*c*.

Accordingly, the learning control unit 43 may monitor the impedance change amount that varies according to a loading state of each of the loads 21*a*, 21*b*, 21*c*, 23*a*, 23*b*, and 23*c* or the environmental change.

Next, the learning control unit 43 may perform learning by using the learning control algorithm.

An optimal control mode may be selected from among a plurality of control modes for compensation of reactive power, through the learning.

Learning execution is a term such as learning control, which introduces a learning function of a human into a control system, and gives the control system a function of changing behavior by experience as in humans.

A human being remembers facts that he/she has experienced under certain conditions or learned from the outside, and judges and behaves based on the memorized experience when encountering the same conditions. Learning of a driving method of an automobile may be an example thereof.

When the learning function is applied to the control system, information necessary for a control operation can be obtained by experience even in an environment where the dynamic characteristics of the control system and the nature of disturbance signals are not sufficiently known. In the learning control system, education should be carried out to improve a learning effect. Education may be generally performed in the form of summarizing and memorizing past experiences by installing training models and modifying the models.

The control mode may include the voltage control mode, the reactive power control mode, the flicker compensation mode, and the voltage unbalance mode.

One of the voltage control mode, the reactive power control mode, the flicker compensation mode, and the voltage unbalance mode may be selected based on the impedance change amount that varies according to the loading state of each of the loads 21a, 21b, 21c, 23a, 23b, and 23c or the environmental change.

The learning control unit 43 may calculate a reactive power amount according to the selected control mode (S119), and determine a reactive power compensation portion based on the calculated reactive power amount (S121).

The reactive power amount may be calculated based on the measured impedance value of each of the loads 21a, 21b, 21c, 23a, 23b, and 23c.

The impedance value may be expressed by Equation 1 below.

$$Z=\sqrt{(R^2+X^2)}=\sqrt{R^2+(X_L-X_C)}$$ [Equation 1]

In Equation 1, "Z" denotes an impedance, "R" denotes a resistance, and "X(=$X_L$-$X_C$)" denotes a total reactance.

The "X" may have a positive value when inductive and a negative value when capacitive.

Whether a load has an inductive component or a capacitive component may be determined based on the measured impedance value.

A reactive power may be expressed by Equation 2 below.

$$Q=U*I=ZI2$$

In Equation 2, "Q" denotes a reactive power, "U" denotes a reactance voltage, and "I" denotes a current.

Accordingly, the reactive power may be calculated by the measured impedance Z and the current I flowing in the receiving end 11.

The reactive power compensation portion may be a voltage to be increased when the control mode is the voltage control mode.

When the control mode is the reactive power control mode or the flicker compensation mode, the reactive power compensation portion may be calculated to be +Q or −Q according to leading reactive power or lagging reactive power.

The leading reactive power may be a reactive power when a phase of current advances a phase of a voltage. The lagging reactive power may be a reactive power when a phase of a voltage advances a phase of current.

The learning control unit 43 may generate a control signal by reflecting the reactive power compensation portion (S123).

The reactive power may be compensated in response to the control signal (S125).

After the reactive power is compensated, the learning control unit 43 may continuously calculate a load impedance change amount according to a loading state or an environmental change (S127), and then the operations S117 to S125 may be performed.

In the present disclosure, since an optimal control mode may be determined by using a learning control algorithm based on the impedance change amount of each of the loads 21a, 21b, 21c, 23a, 23b, and 23c according to the loading state of each of the loads 21a, 21b, 21c, 23a, 23b, and 23c or the environmental change, and the reactive power is compensated according to the determined control mode, not only efficient use of power may be possible, but also reliability of a reactive power compensation system may be improved.

As described above, in the reactive power compensation system according to the present disclosure, and the method thereof, reactive power may be compensated by reflecting an impedance change amount that varies according to a loading state of each of the loads or an environmental change. Accordingly, since relatively accurate compensation of reactive power is performed, power may be efficiently used and further reliability of a reactive power compensation system may be improved.

The present disclosure described above may be variously substituted, altered, and modified by those skilled in the art to which the present inventive concept pertains without departing from the scope and sprit of the present disclosure. Therefore, the present disclosure is not limited to the above-mentioned exemplary embodiments and the accompanying drawings.

What is claimed is:

1. A system for compensating reactive power, the system comprising:
   a reactive power compensation unit configured to measure compensate reactive power;
   an impedance measurement unit configured to measure an impedance value of each of a plurality of loads; and
   a learning control unit configured to monitor an impedance change amount according to a loading state or an environmental change, determine a control mode based on a monitored impedance change amount, and generate a control signal to control the reactive power compensation unit according to the determined control mode.

2. The system of claim 1, wherein the control mode is selected from the group consisting of a voltage control mode, a reactive power control mode, a flicker compensation mode, and a voltage unbalance mode.

3. The system of claim 2, wherein, when the control mode is selected from the group consisting of the reactive power control mode and the flicker compensation mode, the control signal is provided to the reactive power compensation unit to compensate reactive power of the reactive power compensation unit.

4. The system of claim 2, wherein, when the control mode is the voltage control mode, the control signal is transmitted to a supply end to increase a voltage of power of the supply end.

5. The system of claim 1, wherein the environmental change is at least one selected from the group consisting of a type, an amount, and a temperature of a work to be processed by each of the loads.

6. A method of compensating reactive power, the method comprising:
   measuring an impedance value of each of a plurality of loads;
   monitoring an impedance change amount according to a loading state of each of the loads or an environmental change;
   determining a control mode based on a monitored impedance change amount; and
   generating a control signal to compensate reactive power according to the determined control mode.

7. The method of claim 6, wherein the control mode is selected from the group consisting of a voltage control mode, a reactive power control mode, a flicker compensation mode, and a voltage unbalance mode.

8. The method of claim 6, wherein the environmental change is at least one selected from the group consisting of a type, an amount, and a temperature of a work to be processed by each of the loads.

9. The method of claim 6, wherein the control mode is determined by using a learning control algorithm.

10. The method of claim 9, wherein the learning control algorithm is selected from the group consisting of fuzzy, neural, chaos, and artificial intelligence.

* * * * *